United States Patent
Easter et al.

(12)
(10) Patent No.: US 6,373,945 B1
(45) Date of Patent: Apr. 16, 2002

(54) TERMINAL BLOCK EXTENSION FOR GREATER WIRE PACKING EFFICIENCY

(75) Inventors: William G. Easter; Dale D. Evans; John A. Maze; Frank Miceli; Jose Omar Rodriguez, all of Orlando, FL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/417,232

(22) Filed: Oct. 13, 1999

(51) Int. Cl.[7] .............................. H04M 1/00; H01R 4/24

(52) U.S. Cl. ........................................ 379/438; 439/425

(58) Field of Search ................................. 379/438, 399; 439/425, 352, 638, 668

(56) References Cited

U.S. PATENT DOCUMENTS 4,295,702 A * 10/1981 Snyder ........................ 439/425

* cited by examiner

Primary Examiner—Jack Chiang (57) ABSTRACT

The present invention provides a terminal block extension for use with a terminal block having electrical contacts and that is electrically coupled to a wiring system. In one embodiment, the terminal block comprises an insulating body having first and second coupling ends and a first conductor disposed within the insulating body having first and second conducting ends. The first coupling end is configured to mechanically couple to the terminal block. The second coupling end is configured to mechanically couple to another terminal block extension. The first conducting end is configured to couple to one of the electrical contacts. The second conducting end is configured to receive a first wire of the wiring system and cooperatively engage a first coupling end of another terminal block extension.

17 Claims, 7 Drawing Sheets

FIG. 6

TERMINAL BLOCK EXTENSION FOR GREATER WIRE PACKING EFFICIENCY

TECHNICAL FIELD OF THE INVENTION

The present invention is directed, in general, to a wiring apparatus and, more specifically, to an apparatus for increasing the surface area packing density of analog wiring in analog telephone junction boxes for multiple extension installations.

BACKGROUND OF THE INVENTION

In many industrial sites, analog wiring is still used to provide telephone service to large areas with a single telephone line. Multiple extensions are required over the entire area in order to permit workers to readily make and receive telephone calls from anywhere in the work area. Such a system, of course, saves significantly in limiting the number of telephone lines needed to support a large work area, as billing is based upon the number of lines, not the number of telephones accessing the same line. Also, this system makes it possible for an incoming call to be routed to a worker without knowing the worker's precise location within a large work area. The system also makes it easier for the calling party to reach the worker by dialing a single number for a worker that may be anywhere in a large work area. Also, by staying with analog phones, the much greater expense of cellular phones is avoided.

Figure 1:
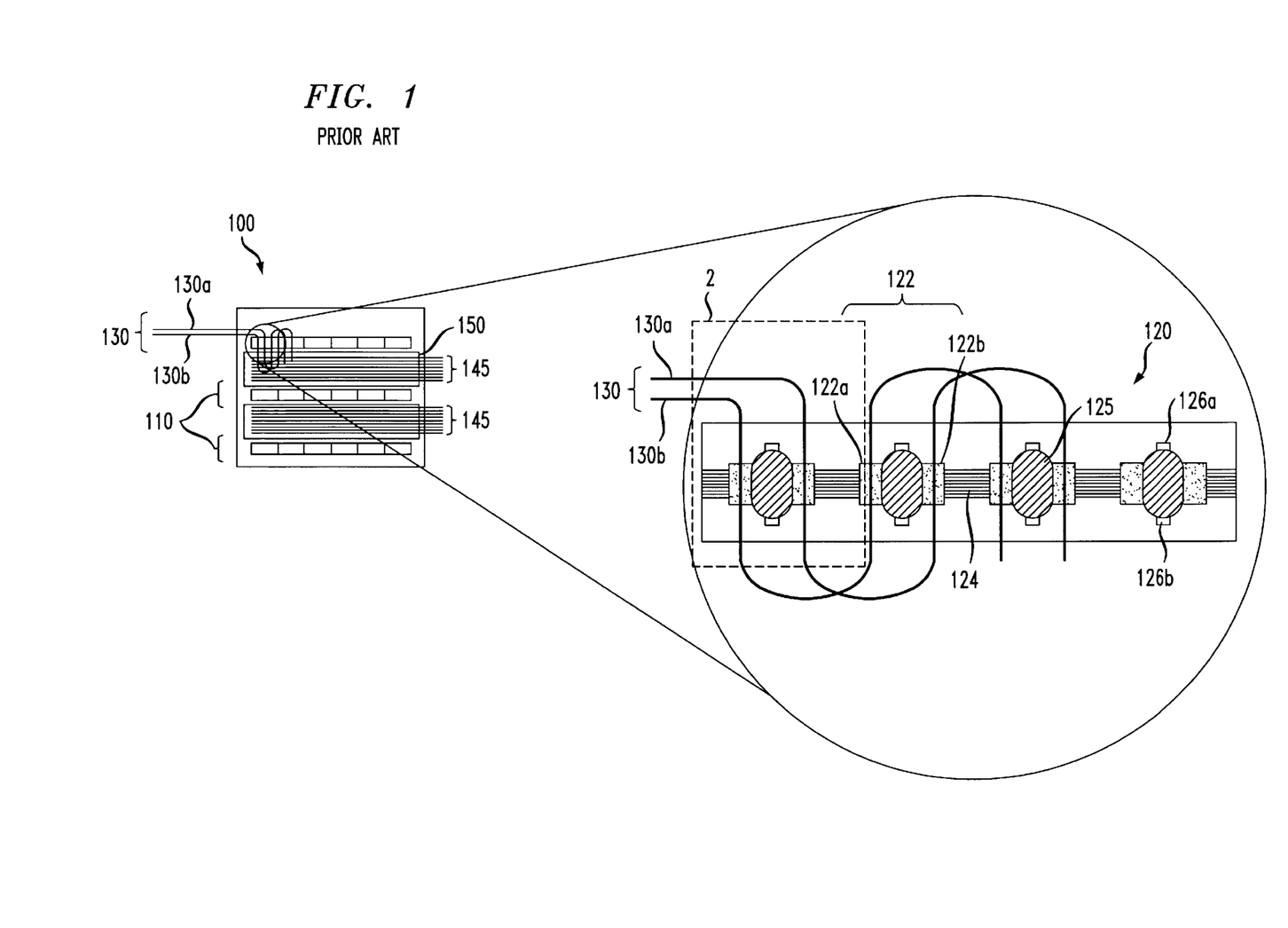
FIG. 1 illustrates a block diagram of a conventional analog telephone junction box with an exploded view of a terminal block.

However, as any telephone installer will readily admit, the telephone junction boxes for a large number of analog telephones may be quite large, occupying several square feet of a wall. Typically, the incoming cable pair for each line is routed to a terminal bar inside the telephone junction box. Referring initially to FIG. 1, illustrated is a block diagram of a conventional analog telephone junction box 100 with an exploded view of a terminal block 120. The conventional analog telephone junction box 100 comprises terminal bars 110 made up of a row of terminal blocks 120. Each terminal block 120 in the illustrated embodiment comprises a plurality of connector pairs 122, each pair separated by an insulator post 124. A conventional terminal block 120 in common usage is the Anixter 110C Connecting Block, that will be generally referred to as a terminal block for this discussion. The connector pairs 122 comprise two one-wire push-to-couple contacts 122a, 122b on either side of an extension indicator post 125 that also serves as an insulator. The incoming cable pair 130a, 130b, representing a single telephone line, is looped successively above and below the series of extension indicator posts 125 in a serpentine manner.

Figure 2:
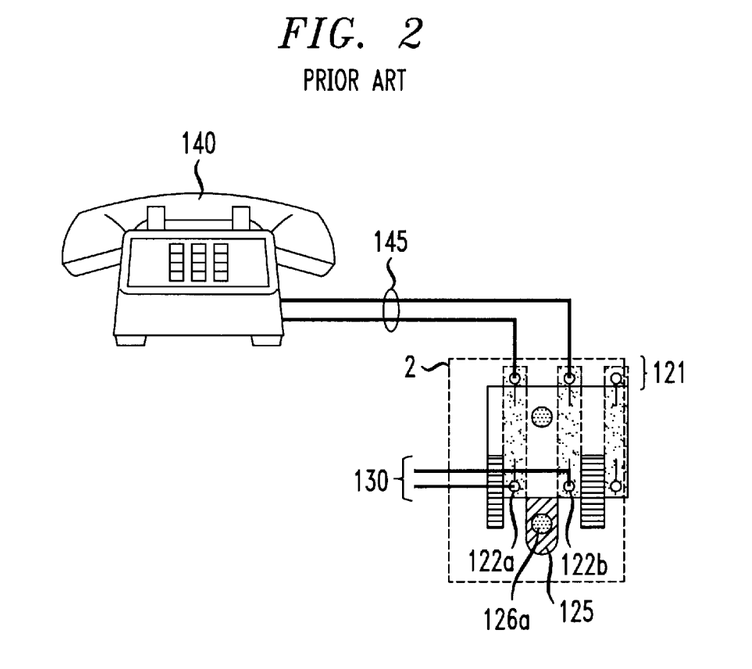
FIG. 2 illustrates an enlarged plan view of the conventional terminal block of FIG. 1.

Referring now to FIG. 2 with continuing reference to FIG. 1, illustrated is an enlarged plan view of a portion 2—2 of the conventional terminal block 120 of FIG. 1. Each extension indicator post 125 is differently colored to designate a single extension telephone 140 of up to four extension telephones coupled to a single terminal block 120. The extension indicator post 125 further comprises upper and lower protuberances 126a, 126b. Individual cable pairs 145 to each extension phone 140 are coupled to the backplane 121 of the terminal bar 110 on either side of the colored extension indicator post 125. By looping each of the incoming wires on the same side of an extension indicator post 125, the push-to-couple connectors permit the cable pair 130 to be quickly connected to each of the extension phones 140 in order. The connector pairs 122 present a telephone serviceman with a simple means of coupling an incoming cable pair 130a, 130b to a plurality of extension telephones 140 already coupled to the terminal block 120 at the backplane 121. Cable pairs 145 to the extension telephones 140 are routed through cable races 150. The illustration shows that a large number of extension cable pairs 145 must be packed into the cable races 150. As a practical matter, by doing so the serpentine looping places the incoming cable pair 130 in front of the extension cable pairs 145. However, when an extension 140 has a problem, the extension cable pair 145 must be physically traced to its connection on the backplane 121, often disturbing the connections between the incoming cable pair 130 and the connector pairs 122.

Of course, when large numbers of telephone extensions are installed in a given work area, the dedicated wall area consumed with the junction box can be very high, easily on the order of tens of square feet. In some cases, this wall space in a commercial building could be put to better use.

Accordingly, what is needed in the art is an apparatus for increasing the wiring density of analog telephone wiring in a multiple extension junction box.

SUMMARY OF THE INVENTION

To address the above-discussed deficiencies of the prior art, the present invention provides a terminal block extension for use with a terminal block having electrical contacts and that is electrically coupled to a wiring system. In one embodiment, the terminal block comprises an insulating body having first and second coupling ends and a first conductor disposed within the insulating body having first and second conducting ends. The first coupling end is configured to mechanically couple to the terminal block. The second coupling end is configured to mechanically couple to another terminal block extension. The first conducting end is configured to couple to one of the electrical contacts. The second conducting end is configured to receive a first wire of the wiring system and cooperatively engage a first coupling end of another terminal block extension.

In an alternative embodiment, the insulating body has a first guide aperture therein configured to accept a first wire of the wiring system therein. The first conductor is movably coupled to the insulating body and is configured to pierce an insulation of the first wire as the terminal block extension is coupled to the terminal block.

The terminal block extension, in another embodiment, further comprises a second conductor disposed within the insulating body and having first and second conducting ends. The first conducting end of the second conductor is configured to couple to another one of the electrical contacts. The second conducting end of the second conductor is configured to receive a second wire of the wiring system and cooperatively engage a first coupling end of the another terminal block extension.

In yet another embodiment, the insulating body has a second guide aperture therein configured to accept a second wire of the wiring system therein. The second conductor is movably coupled to the insulating body. The second conductor is configured to pierce an insulation of the second wire as the terminal block extension is coupled to the terminal block.

The wiring system, in an embodiment to be described, is a telephone wiring system and the first and second wires are a telephone cable pair. In a specific aspect of this embodiment, the terminal block extension couples to an Anixter 110C connecting block.

The insulating body, in another embodiment, further comprises upper and lower attachment arms proximate the first coupling end and upper and lower attachment bosses proximate the second coupling end. In a further aspect, the upper attachment arm comprises an upper attachment detent and the lower attachment arm comprises a lower attachment detent. The upper and lower attachment detents are configured to couple to upper and lower protuberances of the terminal block. The upper and lower attachment detents, in yet another embodiment, are configured to cooperate with upper and lower attachment bosses of the another terminal block extension.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 3A:
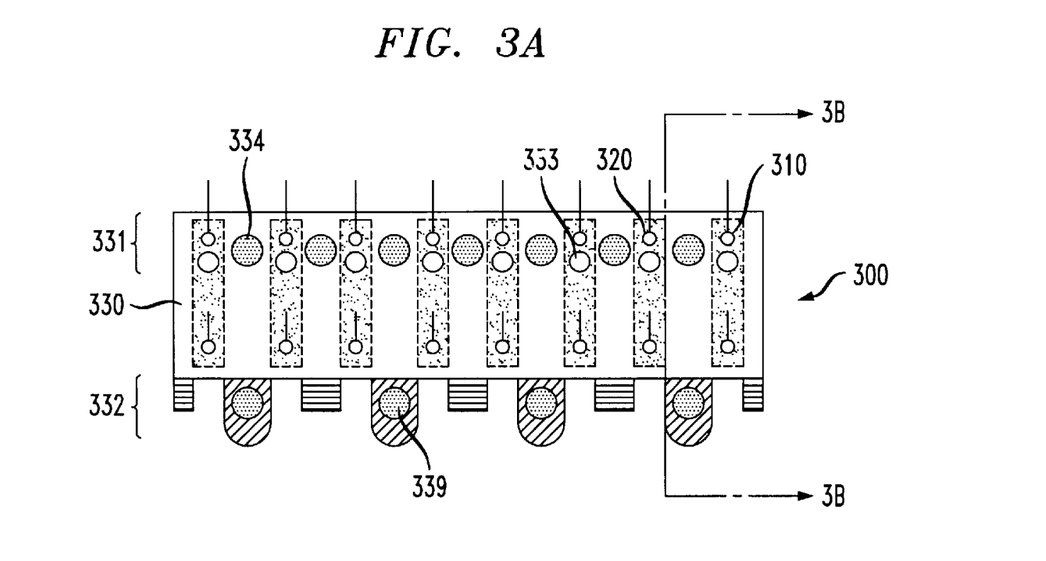
FIG. 3A illustrates a plan view of one embodiment of a terminal block extension constructed according to the principles of the present invention.

Referring now to FIG. 3A, illustrated is a plan view of one embodiment of a terminal block extension 300 constructed according to the principles of the present invention. A portion of the terminal block extension 300 comprises paired first and second conductors, two of which are designated 310, 320, and an insulating body 330. The first and second conductors 310, 320 are disposed within the insulating body 330 which prevents shorting between adjacent first and second conductors 310, 320.

The insulating body 330 comprises first and second coupling ends 331, 332. The first coupling end 331 is configured to mechanically couple to the terminal block 120. The second coupling end 332 is configured to mechanically couple to a first coupling end 331 of an identical second terminal block extension (not shown) using upper and lower bosses 339, 340 (only 339 visible). Thus, several terminal block extensions 300 may be "stacked" upon the terminal block 120.

Figure 3B:
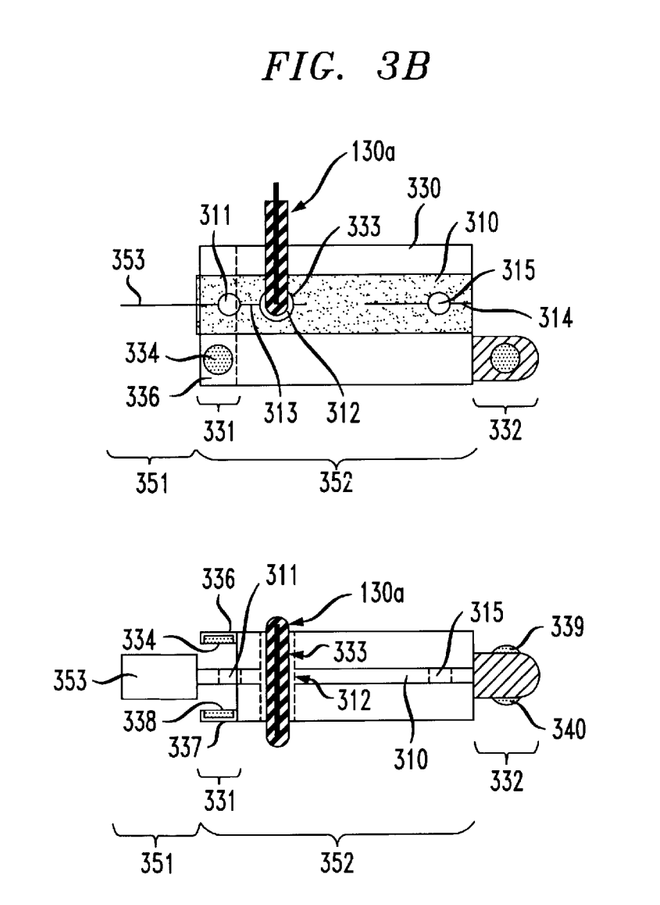
FIG. 3B illustrates plan and elevational sectional views of a single conductor of the terminal block extension of FIG. 3A prior to electrically coupling to the wire.

Referring now to FIG. 3B with continuing reference to FIG. 3A, illustrated are plan and elevational sectional views along plane 3B—3B of a single conductor of the terminal block extension of FIG. 3A prior to electrically coupling to the wire 130a. The insulating body 330 further comprises upper and lower attachment arms 336, 337 proximate the first coupling end 331 and wire apertures 333 therein. The upper and lower attachment arms 336, 337 comprise upper and lower detents, 334, 338. The second coupling end 332 comprises upper and lower bosses 339, 340 that cooperate to form a mechanical coupling with the first coupling end 331 of the identical second terminal block extension (not shown).

Each of the first and second conductors 310, 320 (only 310 shown) have a first conducting end 351 and a second conducting end 352. The first conducting end 351 comprises a blade 353 configured to couple to one of the electrical push-to-couple contacts 122a, 122b. The second conducting end 352 comprises contact apertures 311, 315, a wire access aperture 312, and piercing slits 313, 314 therethrough.

Figure 3C:
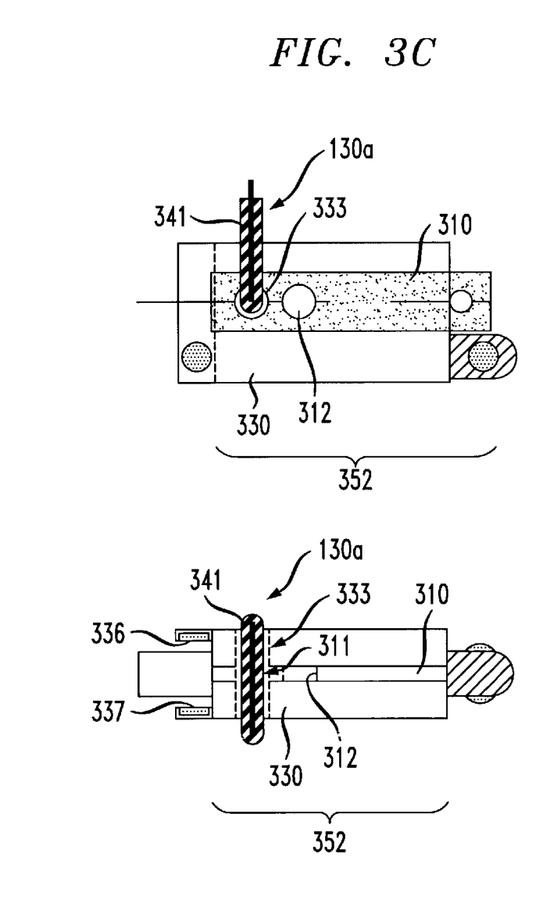
FIG. 3C illustrates plan and elevational sectional views of the single conductor of FIG. 3A after electrically coupling to the wire.

Referring now to FIG. 3C with continuing reference to FIGS. 1, 2, 3A and 3B, illustrated are plan and elevational sectional views of the single conductor 310 of FIG. 3A after electrically coupling to the wire 130a. To couple the wire 130a to the conductor 310, the insulated wire 130a is inserted into wire aperture 333 and through wire access aperture 312 as shown in FIG. 3B. With the insulating body 330 aligned with the terminal block 120, pushing the insulating body 330 causes the blade 353 to engage a push-to-couple contact, for example 122b. Continuing to push on the insulating body 330 causes the conductor 310 to slide within the insulating body 330. Wire aperture 333 prevents the wire 130a from moving relative to the insulating body 330, and the wire 130a therefore slides into piercing slit 313 until the wire 130a is located within and in electrical contact with contact aperture 311. Wire aperture 333 is sized to easily accept the wire 130a with insulation 341 while contact aperture 311 is sized to make secure electrical contact with the wire 130a. Thus, the second conducting end 352 pierces the insulation 341 of the wire 130a and makes electrical contact.

As the insulating body 330 is pushed onto the terminal block 120, the upper and lower attachment arms 336, 337 spread to accommodate the upper and lower protuberances 126a, 126b. When the insulating body 330 is in a fully seated position, the upper and lower protuberances 126a, 126b cooperate with the upper and lower detents 334, 338 to mechanically couple the terminal block extension 300 to the terminal block 120. With the movement of the conductor 310 relative to the insulating body 330, contact aperture 315 and piercing slit 314 become available to couple to additional extension cable pairs 145.

Figure 4A:
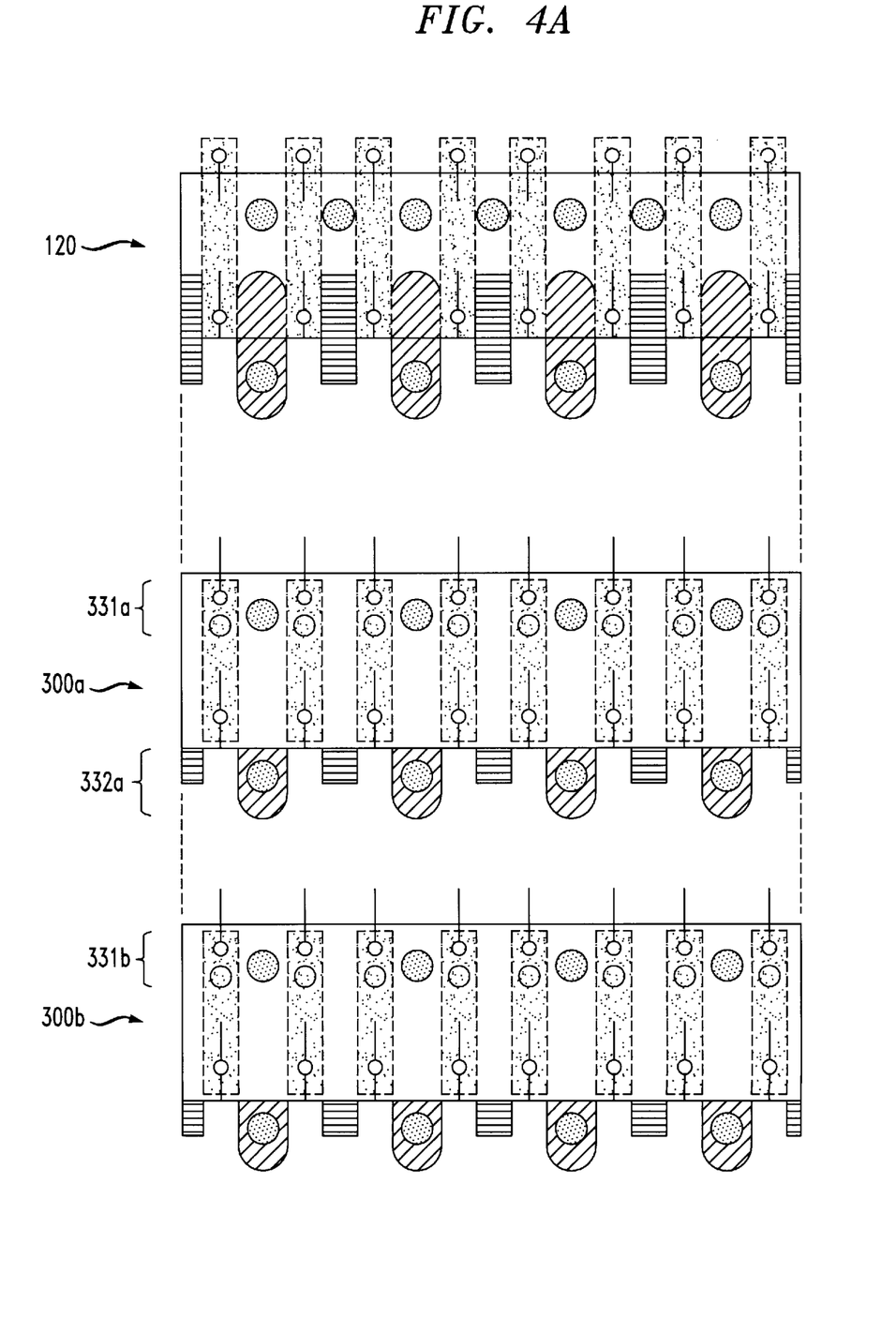
FIG. 4A illustrates an exploded plan view of a terminal block and first and second terminal block extensions.

Referring now to FIG. 4A, illustrated is an exploded plan view of a terminal block 120, and first and second terminal block extensions 300a, 300b. The first coupling end 331a of the first terminal block extension 300a is configured to mechanically couple to the terminal block 120 and the second coupling end 331b of the first terminal block extension 300a is configured to mechanically couple to a first coupling end 332a of the second terminal block extension 300b. Of course, one who is skilled in the art will recognize that additional terminal block extensions 300 may be added up to a practical limit.

Figure 4B:
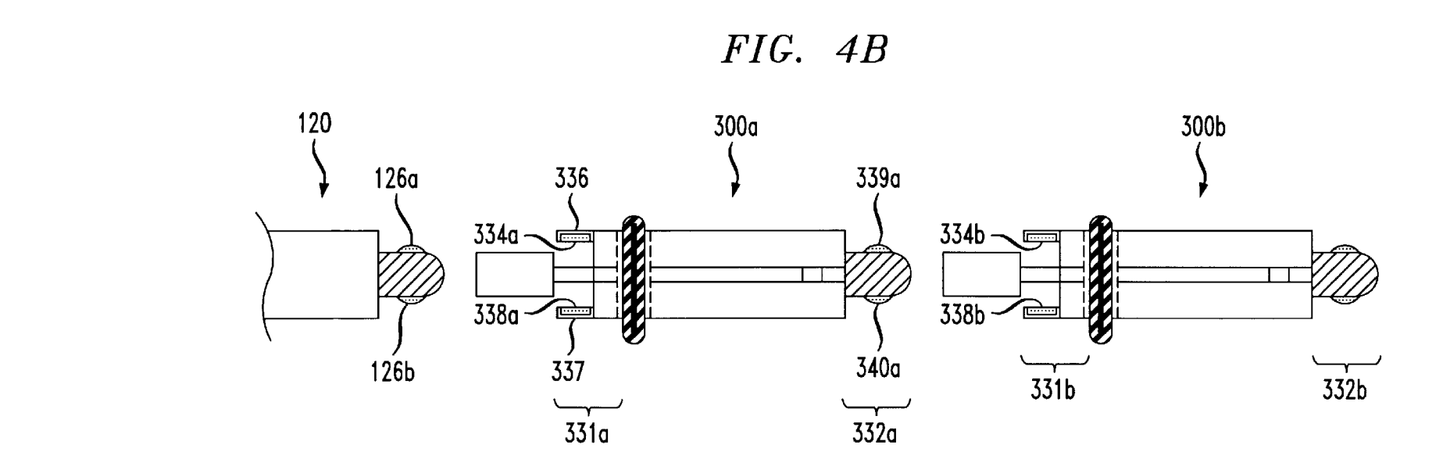
FIG. 4B illustrates an exploded profile view of a terminal block and first and second terminal block extensions.

Referring now to FIG. 4B, illustrated is an exploded profile view of a terminal block 120, and first and second terminal block extensions 300a, 300b. The first coupling end 331a of the first terminal block extension 300a is configured to mechanically couple to the terminal block 120 and the second coupling end 332a of the first terminal block extension 300a is configured to mechanically couple to the first coupling end 331b of the second terminal block extension 300b. The upper and lower protuberances 126a, 126b of the terminal block 120 cooperate with the upper and lower detents 334a, 338a to mechanically couple the first terminal block extension 300a to the terminal block 120. In a similar manner, the upper and lower bosses 339a, 340a of the first terminal block extension 300a cooperate with the upper and lower detents 334b, 338b of the second terminal block extension 300b to mechanically couple the second terminal block extension 300b to the first terminal block extension 300a. Terminal block extensions 300a, 300b are configured to interchangeably couple to either a terminal block 120 or another terminal block extension 300.

Figure 4C:
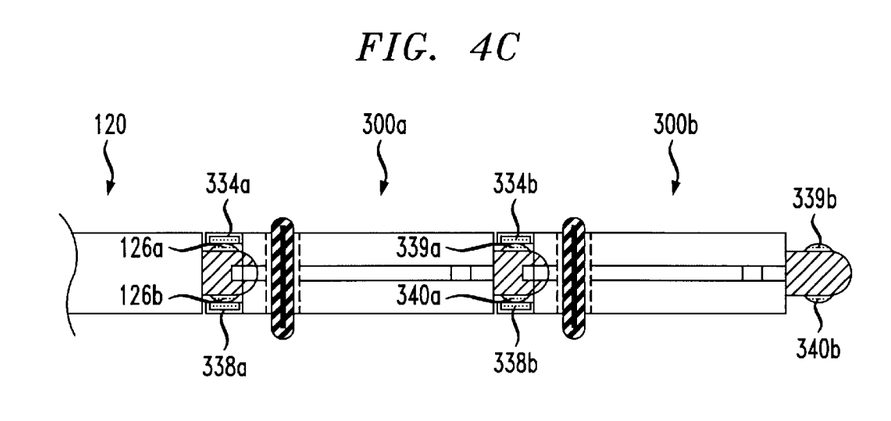
FIG. 4C illustrates a profile view of the first terminal block extension coupled to the terminal block, and the second terminal block extension coupled to the first terminal block extension.

Referring now to FIG. 4C, illustrated is a profile view of the first terminal block extension 300a coupled to the terminal block 120, and the second terminal block extension 300b coupled to the first terminal block extension 300a. One who is skilled in the art will readily understand from FIG. 4C how the upper and lower protuberances 126a, 126b cooperate with the upper and lower detents 334a, 338a, and the upper and lower bosses 339a, 340a cooperate with the upper and lower detents 334b, 338b.

Figure 5:
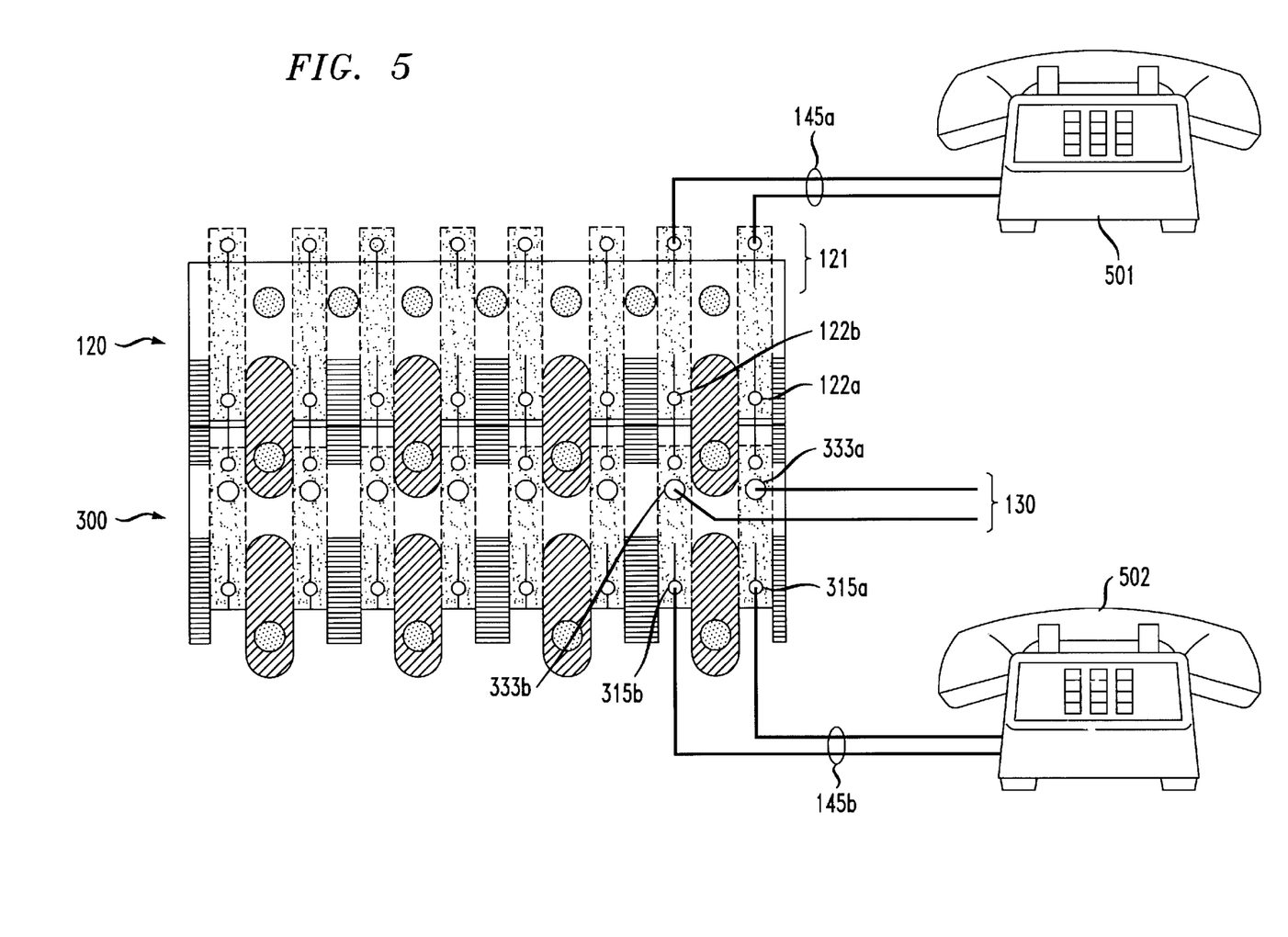
FIG. 5 illustrates a plan view of the terminal block, a single terminal block extension, and first and second extension telephones.

Referring now to FIG. 5, illustrated is a plan view of the terminal block 120, a single terminal block extension 300, and first and second extension telephones 501, 502. Coupled to the backplane 121 of the terminal block 120 is the first extension telephone 501. As previously detailed, incoming cable pair 130 would ordinarily couple directly to push-to-couple contacts 122a, 122b. However, for this application using a terminal block extension 300, the incoming cable pair 130 is instead routed to wire apertures 333a, 333b in the single terminal block extension 300. To couple the second extension telephone 402, an extension cable pair 145b is coupled to contact apertures 315a, 315b.

Figure 6:
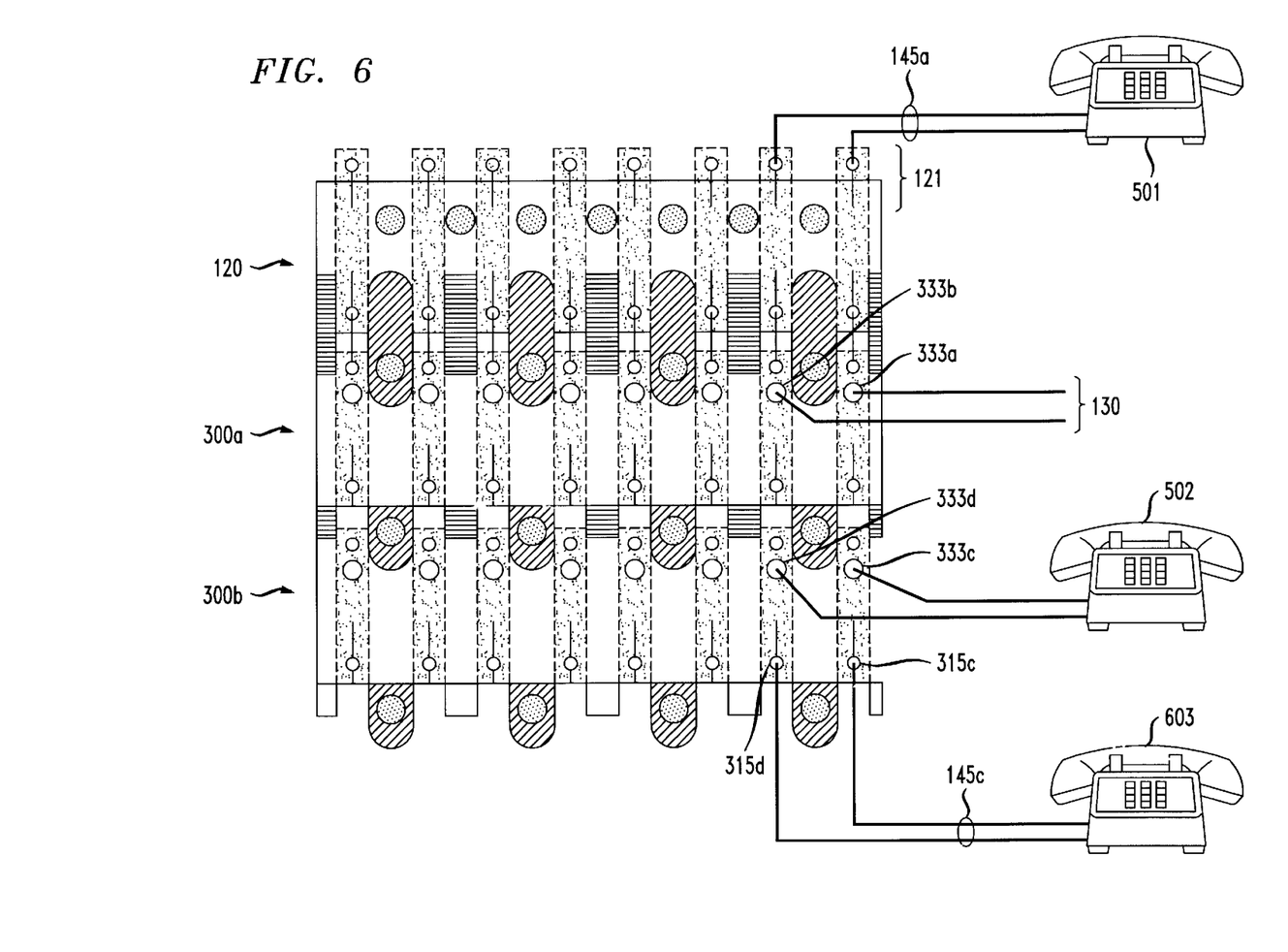
FIG. 6 illustrates a plan view of the terminal block, and first and second terminal block extensions with three telephones installed.

Referring now to FIG. 6, illustrated is a plan view of the terminal block 120, and first and second terminal block extensions 300a, 300b, with three telephones 501, 502, 603 installed. The first extension telephone 501 remains coupled to the backplane 121 of the terminal block 120. In this case, the second extension telephone 502 is coupled to the first terminal block extension 300a at wire apertures 333a, 333b. The third extension telephone 603 is coupled to the second terminal block extension 300b at contact apertures 315c, 315d. Of course, this may be repeated as desired up to the practical limit of the terminal block extensions 300.

One who is skilled in the art can readily see that with just two terminal block extensions 300a, 300b, that a total of 12 telephones representing from one to four incoming telephone lines may be coupled in a space that previously accommodated only 4 extension telephones. Adding two additional terminal block extensions 300 would increase the available number of telephones to 20 extensions on from one to four incoming telephone lines. Compactness of the terminal block extensions 300 will dictate how many terminal block extensions 300 may be stacked.

Thus, a terminal block extension has been described that couples to a terminal block and provides coupling for additional extension telephones that, in turn, reduces the wall surface area needed to support multiple extensions on a single telephone line. The terminal block extension is configured further to accept an additional terminal block extension to couple still more telephones.

Although the present invention has been described in detail, those skilled in the art should understand that they can make various changes, substitutions and alterations herein without departing from the spirit and scope of the invention in its broadest form.

What is claimed is:

1. For use with a terminal block having electrical contacts and that is electrically coupled to a wiring system, a terminal block extension, comprising:
   an insulating body having first and second coupling ends, the first coupling end configured to mechanically couple to the terminal block and the second coupling end configured to mechanically couple to another terminal block extension, and a first guide aperture therein configured to accept a first wire of the wiring system therein; and
   a first conductor movably coupled to the insulating body and disposed therein and configured to pierce an insulation of the first wire as the terminal block extension is coupled to the terminal block and having first and second conducting ends, the first conducting end configured to couple to one of the electrical contacts, and the second conducting end configured to receive a first wire of the wiring system and cooperatively engage a first coupling end of the another terminal block extension.

2. The terminal block extension as recited in claim 1 further comprising a second conductor disposed within the insulating body and having first and second conducting ends, the first conducting end of the second conductor configured to couple to another one of the electrical contacts, and the second conducting end of the second conductor configured to receive a second wire of the wiring system and cooperatively engage a first coupling end of the another terminal block extension.

3. The terminal block extension as recited in claim 2 wherein the insulating body has a second guide aperture therein configured to accept a second wire of the wiring system therein, and the second conductor is movably coupled to the insulating body, the second conductor configured to pierce an insulation of the second wire as the terminal block extension is coupled to the terminal block.

4. The terminal block extension as recited in claim 3 wherein the wiring system is a telephone wiring system and the first and second wires are a telephone cable pair.

5. The terminal block extension as recited in claim 4 wherein the terminal block extension couples to an Anixter 110C connecting block.

6. The terminal block extension as recited in claim 1 wherein the insulating body further comprises upper and lower attachment arms proximate the first coupling end, and upper and lower attachment bosses proximate the second coupling end.

7. The terminal block extension as recited in claim 6 wherein the upper attachment arm comprises an upper attachment detent and the lower attachment arm comprises a lower attachment detent, the upper and lower attachment detents configured to couple to upper and lower protuberances of the terminal block.

8. The terminal block extension as recited in claim 6 wherein the upper and lower attachment detents are configured to cooperate with upper and lower attachment bosses of the another terminal block extension.

9. A method of manufacturing a terminal block extension for use with a terminal block having electrical contacts and that is electrically coupled to a wiring system, comprising:

providing an insulating body having first and second coupling ends, the first coupling end configured to mechanically couple to the terminal block and the second coupling end configured to mechanically couple to another terminal block extension, and a first guide aperture therein configured to accept a first wire of the wiring system therein; and disposing a first conductor within the insulating body and movably coupling the first conductor to the insulating body, the first conductor configured to pierce an insulation of the first wire as the terminal block extension is coupled to the terminal block, and having first and second conducting ends, the first conducting end configured to couple to one of the electrical contacts, and the second conducting end configured to receive a first wire of the wiring system and cooperatively engage a first coupling end of the another terminal block extension.

10. The method as recited in claim 9 wherein disposing includes disposing a second conductor within the insulating body, the second conductor having first and second conducting ends, the first conducting end of the second conductor configured to couple to another one of the electrical contacts, and the second conducting end of the second conductor configured to receive a second wire of the wiring system and cooperatively engage the first coupling end of the another terminal block extension.

11. The method as recited in claim 9 wherein providing includes providing an insulating body further comprising upper and lower attachment arms proximate the first coupling end, and upper and lower attachment bosses proximate the second coupling end.

12. The method as recited in claim 11 wherein providing includes providing an insulating body having a second guide aperture therein configured to accept the second wire therein, and disposing includes movably coupling the second conductor to the insulating body, the second conductor configured to pierce an insulation of the second wire as the terminal block extension is coupled to the terminal block.

13. The method as recited in claim 11 wherein providing includes providing an insulating body wherein the upper attachment arm comprises an upper attachment detent and the lower attachment arm comprises a lower attachment detent, the upper and lower attachment detents configured to couple to upper and lower protuberances of the terminal block.

14. The method as recited in claim 11 wherein providing includes providing an insulating body wherein the upper and lower attachment detents are configured to cooperate with upper and lower attachment bosses of the another terminal block extension.

15. A telephone system, comprising:

a telephone cable pair having first and second wires therein;

a terminal block having first and second electrical contacts, a backplane and a coupling end;

a first extension telephone electrically coupled to the first and second electrical contacts on the backplane; and a first terminal block extension coupled to the terminal block, comprising:

an insulating body having first and second coupling ends, the first coupling end configured to mechanically couple to the terminal block and the second coupling end configured to mechanically couple to a second terminal block extension, and first and second guide apertures therein, said first guide apperture configured to accept the first wire therein and said second guide aperture configured to accept a second wire therein;

a first conductor movably coupled to the insulating body, disposed within the insulating body, configured to pierce an insulation of the first wire as the terminal block extension is coupled to the terminal block, and having first and second conducting ends, the first conducting end of the first conductor configured to couple to the first electrical contact, and the second conducting end of the first conductor configured to receive the first wire and cooperatively engage a first coupling end of the second terminal block extension; and a second conductor movably coupled to the insulating body, disposed within the insulating body, configured to pierce an insulation of the second wire as the terminal block extension is coupled to the terminal block, and having first and second conducting ends, the first conducting end of the second conductor configured to couple to the second electrical contact, and the second conducting end of the second conductor configured to receive the second wire and cooperatively engage the first coupling end of the second terminal block extension.

16. The telephone system as recited in claim 13 further comprising a second extension telephone electrically coupled to the first and second conductors.

17. The telephone system as recited in claim 14 further comprising:

the second terminal block extension coupled to the first terminal block extension and having first and second conductors; and a third extension telephone electrically coupled to the first and second conductors of the second terminal block extension.

* * * * *